(12) United States Patent
Lauret

(10) Patent No.: US 6,714,548 B2
(45) Date of Patent: *Mar. 30, 2004

(54) DIGITAL CLOCK RECOVERY

(75) Inventor: Régis Lauret, Sonchamp (FR)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,460

(22) Filed: Apr. 28, 1998

(65) Prior Publication Data

US 2002/0191645 A1 Dec. 19, 2002

(30) Foreign Application Priority Data

May 2, 1997 (EP) ............................... 97400993

(51) Int. Cl.[7] .............................................. H04L 12/56
(52) U.S. Cl. ................................................... 370/395.62
(58) Field of Search ............................... 370/230, 252, 370/253, 395, 503, 506, 516, 235, 474, 518

(56) References Cited

U.S. PATENT DOCUMENTS

| | | | |
|---|---|---|---|
| 4,571,731 A | * 2/1986 | Klinkovsky et al. | 375/9 |
| 5,260,978 A | 11/1993 | Fleisher et al. | 375/106 |
| 5,608,731 A | 3/1997 | Upp et al. | 370/516 |
| 5,742,649 A | * 4/1998 | Muntz et al. | 375/371 |
| 5,822,383 A | * 10/1998 | Muntz et al. | 370/516 |
| 5,905,411 A | * 5/1999 | Murakami et al. | 331/18 |
| 5,970,107 A | * 10/1999 | Bleiweiss et al. | 375/376 |
| 6,011,823 A | * 1/2000 | Bleiweiss et al. | 375/376 |
| 6,122,337 A | * 9/2000 | Bleiweiss et al. | 375/376 |
| 6,144,714 A | * 11/2000 | Bleiweiss et al. | 375/376 |

FOREIGN PATENT DOCUMENTS

| | | | |
|---|---|---|---|
| EP | 0 671 828 A1 | 9/1995 | H04L/7/00 |
| EP | 0 705 000 A2 | 3/1996 | H04L/3/06 |
| EP | 0 720 319 A2 | 3/1996 | H04L/7/02 |
| JP | 07046230 | 2/1995 | H04L/7/00 |
| WO | PCT/US94/09688 | 3/1995 | H03L/7/18 |

* cited by examiner

*Primary Examiner*—Alpus H. Hsu
*Assistant Examiner*—Toan D. Nguyen
(74) *Attorney, Agent, or Firm*—Christopher P. Maiorana, P.C.

(57) ABSTRACT

A clock recovery mechanism for an ATM receiver recovers a service (source) clock transmitted over an ATM network. The mechanism includes an input for receiving an SRTS from the ATM network, a local SRTS generator for locally generating an SRTS, a comparator for comparing a received SRTS and a locally generated SRTS and a recovered service clock generator responsive to an output of the comparator for generating the recovered service clock and for controlling the local SRTS generator. The locally generated SRTS is compared directly with the received SRTS. The local SRTS is generated using the same method as used to generate the transmitted SRTS, that is using the network clock fnx and a locally generated clock, at frequency fs. The difference between the locally generated SRTS and the received SRTS can be expressed directly in a number of fnx pulse clocks to be added or removed to the generated fs clock. Thus a service clock can be recovered at a receiver location using SRTSs by means of a digital technique.

23 Claims, 7 Drawing Sheets

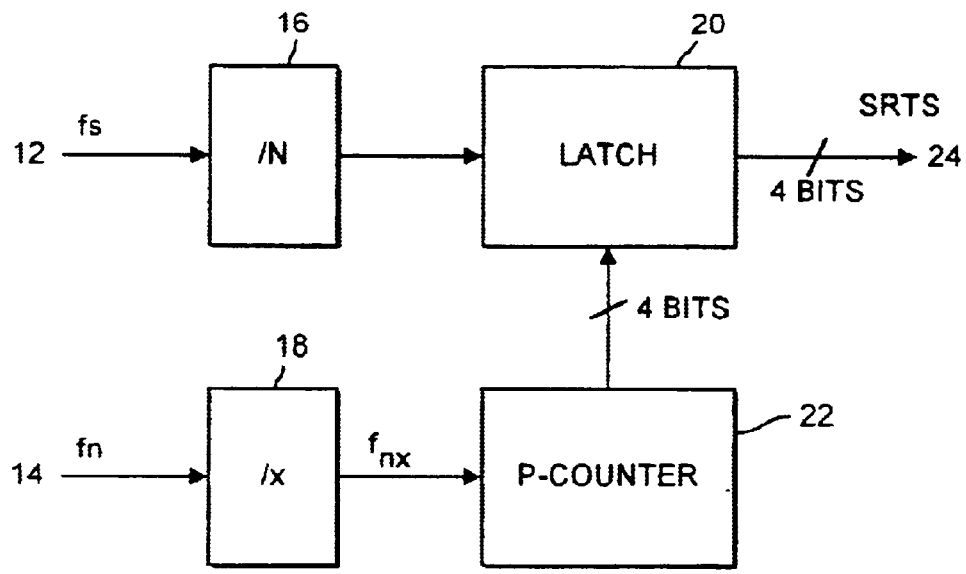
FIG._1 (PRIOR ART)
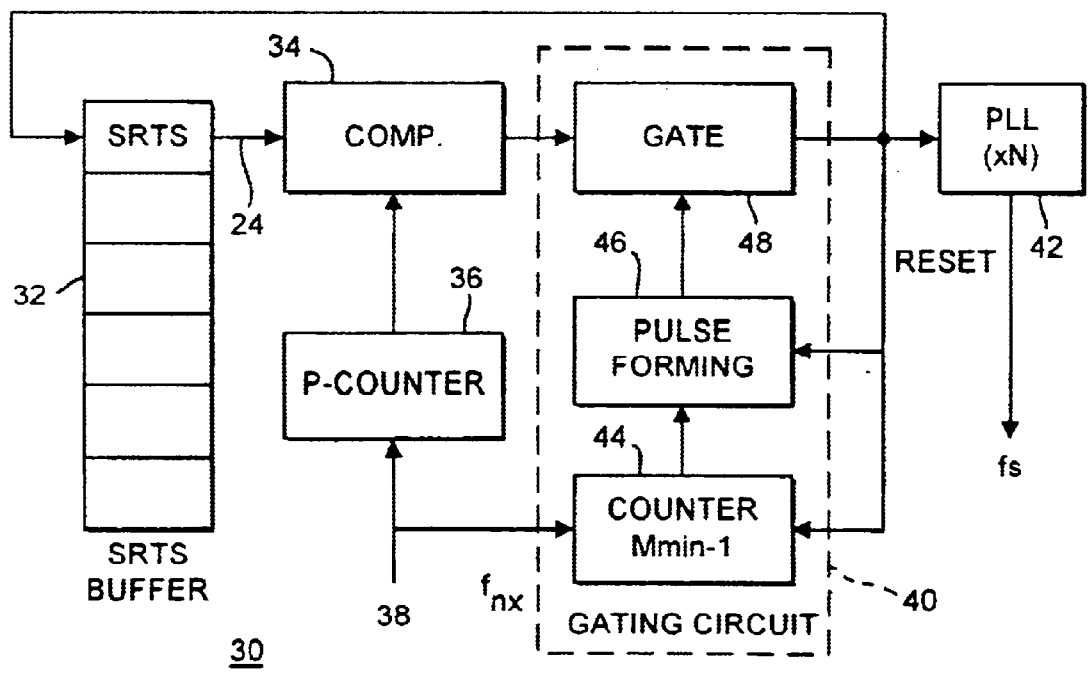
FIG._2 (PRIOR ART)

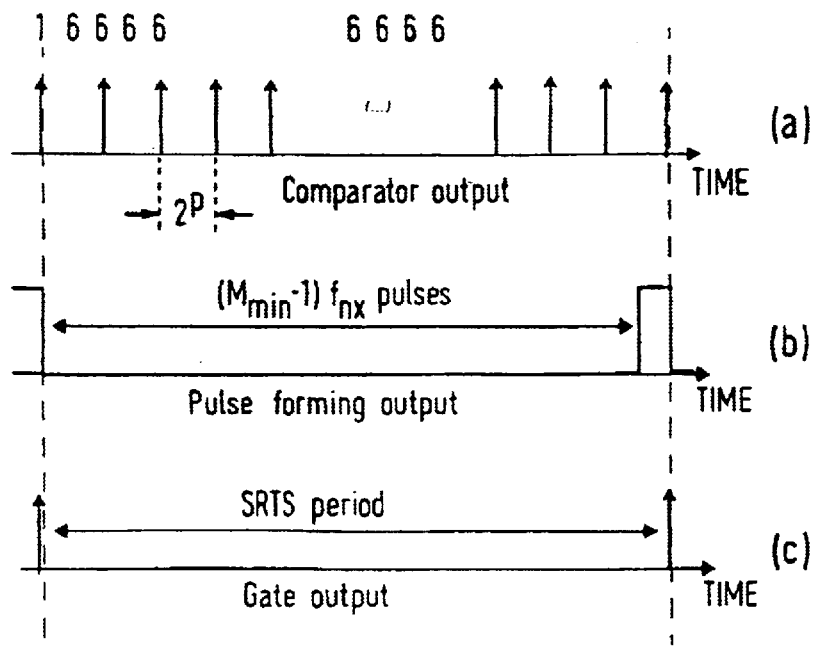
FIG._3 *(PRIOR ART)*
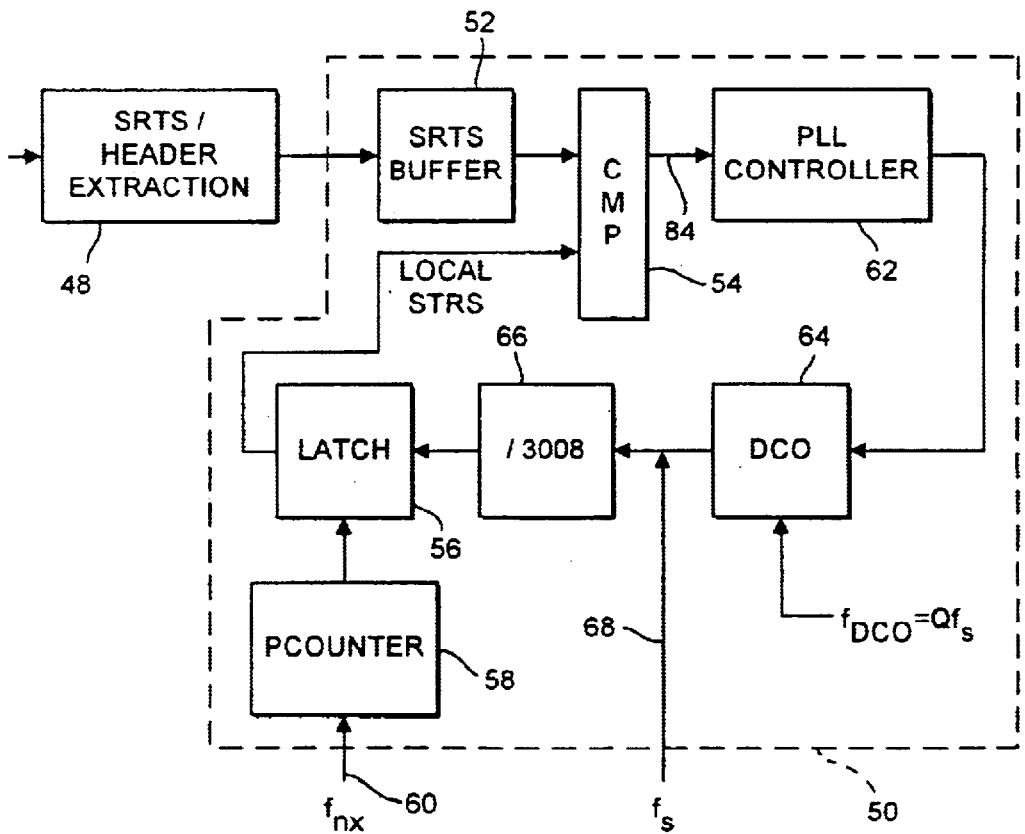
FIG._4

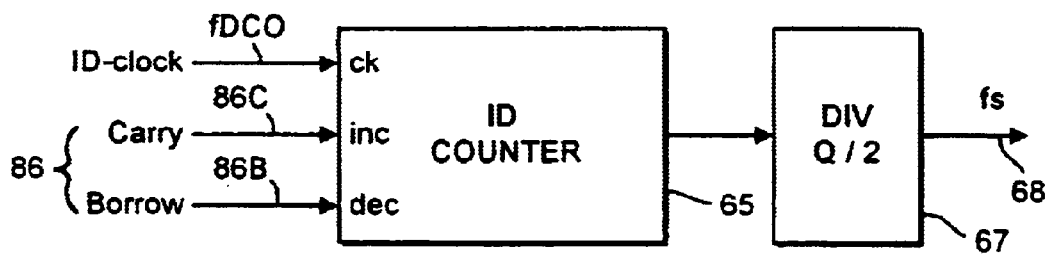
FIG._5
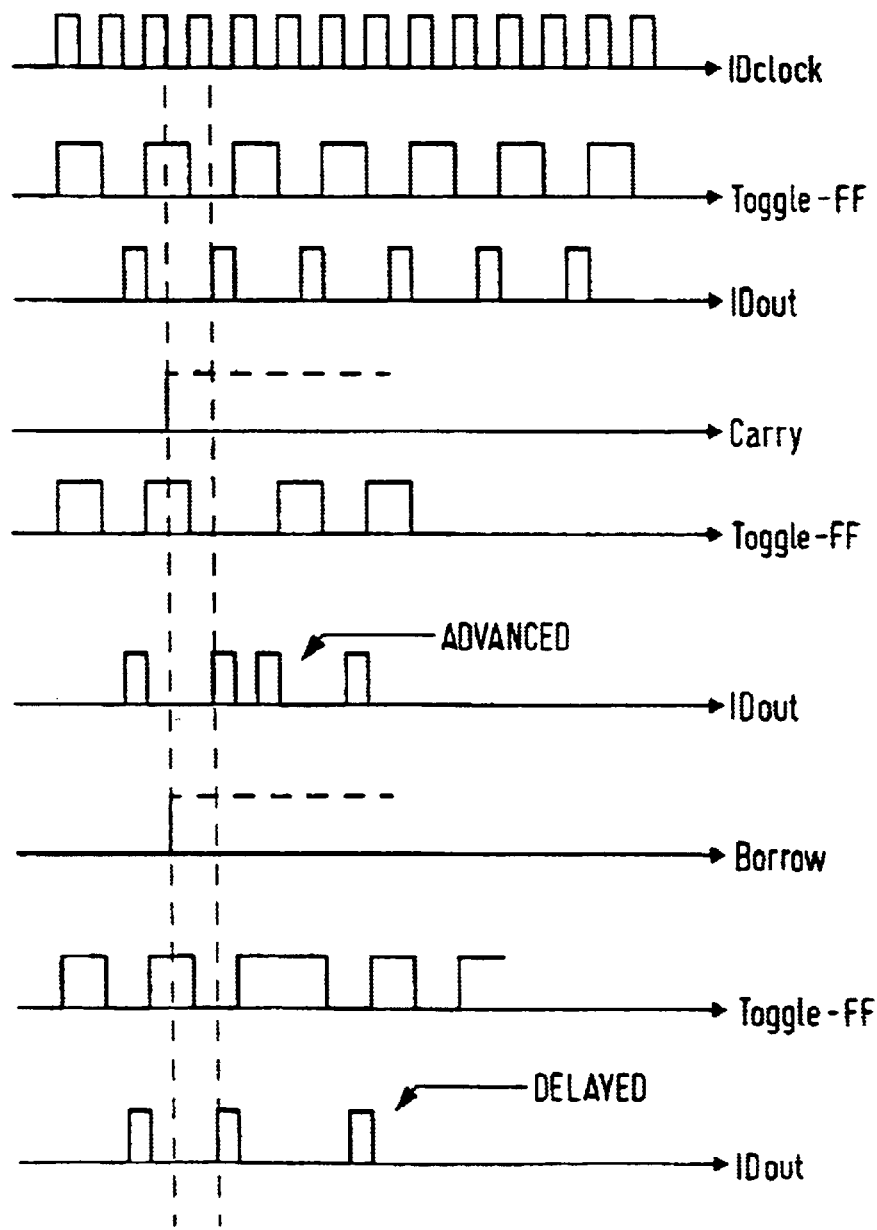
FIG._6

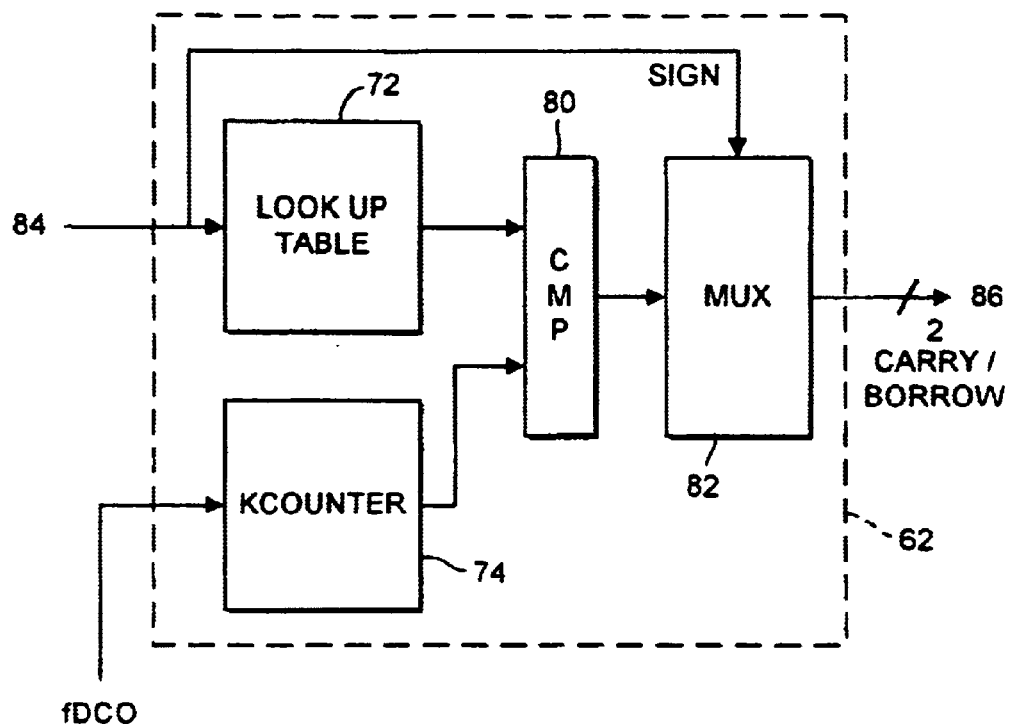
FIG._7
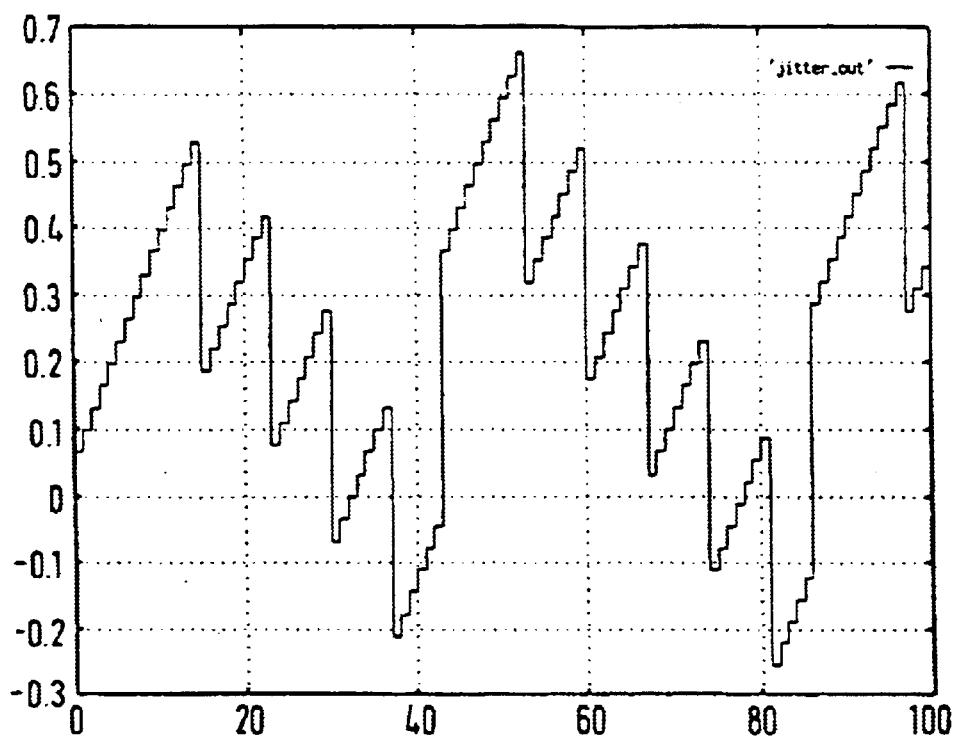
FIG._8

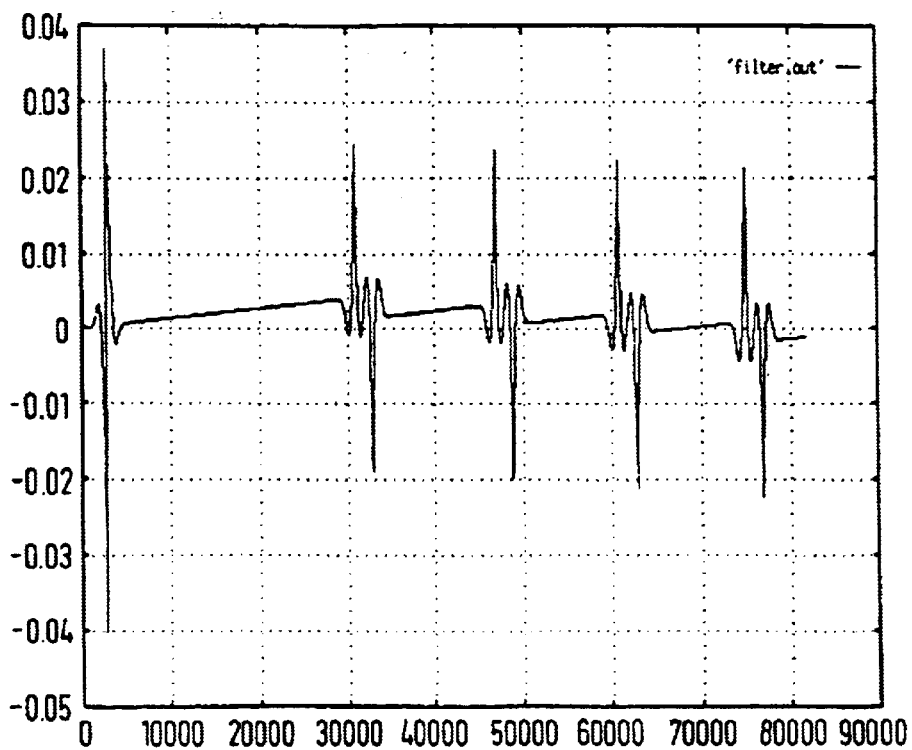
FIG._9
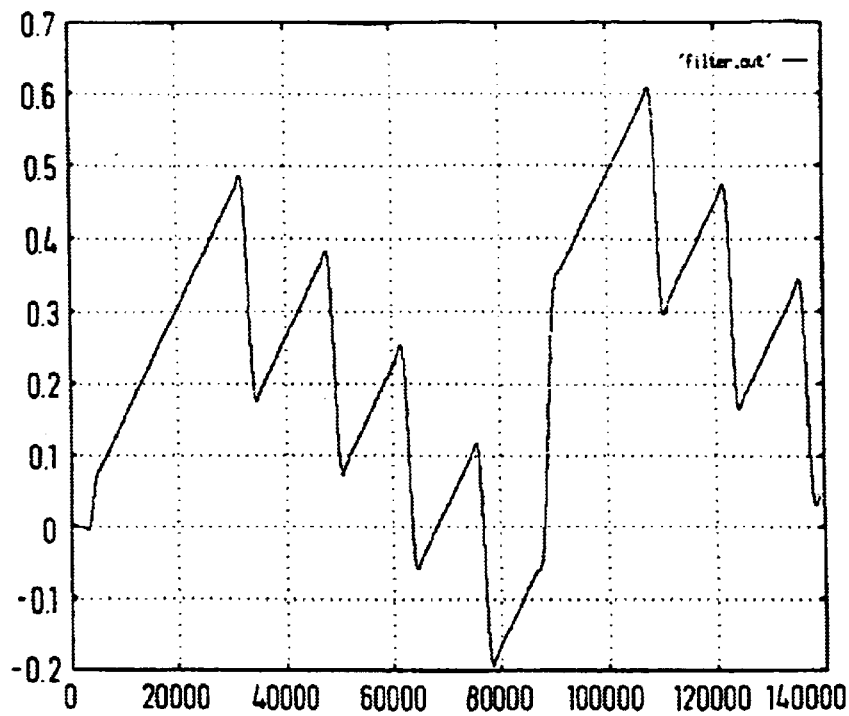
FIG._10

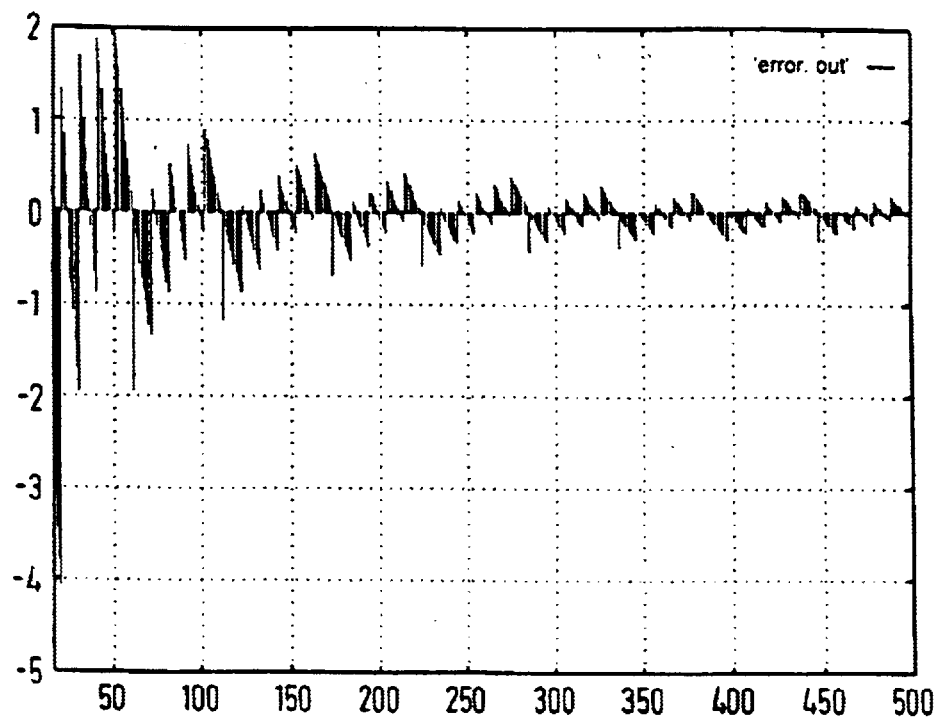
FIG._11
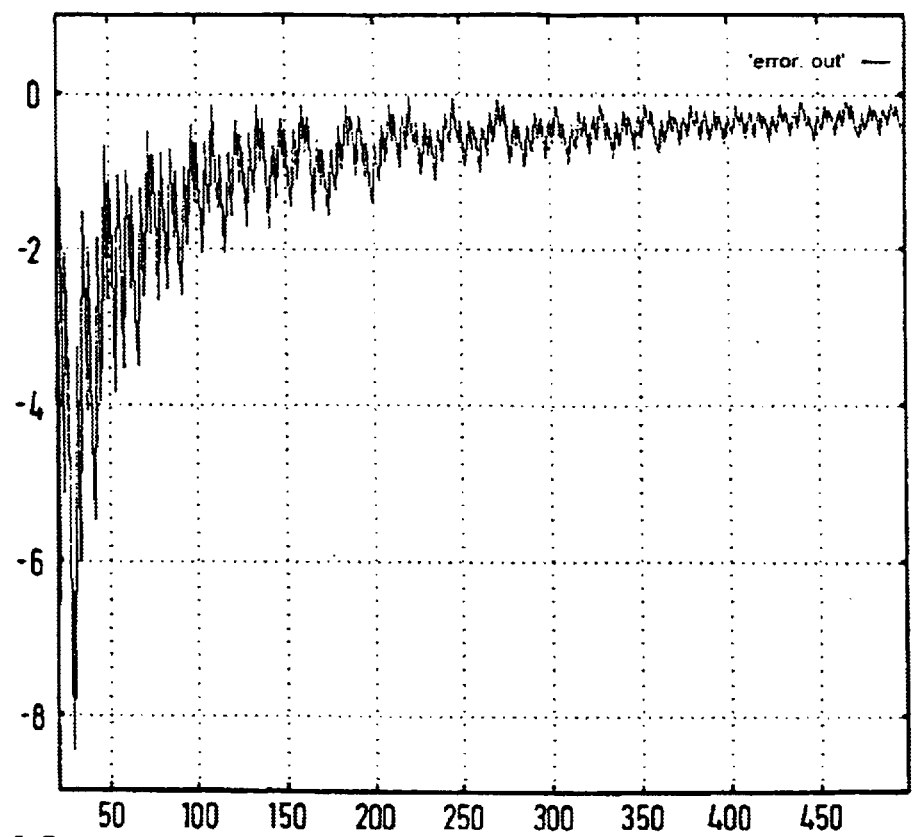
FIG._12

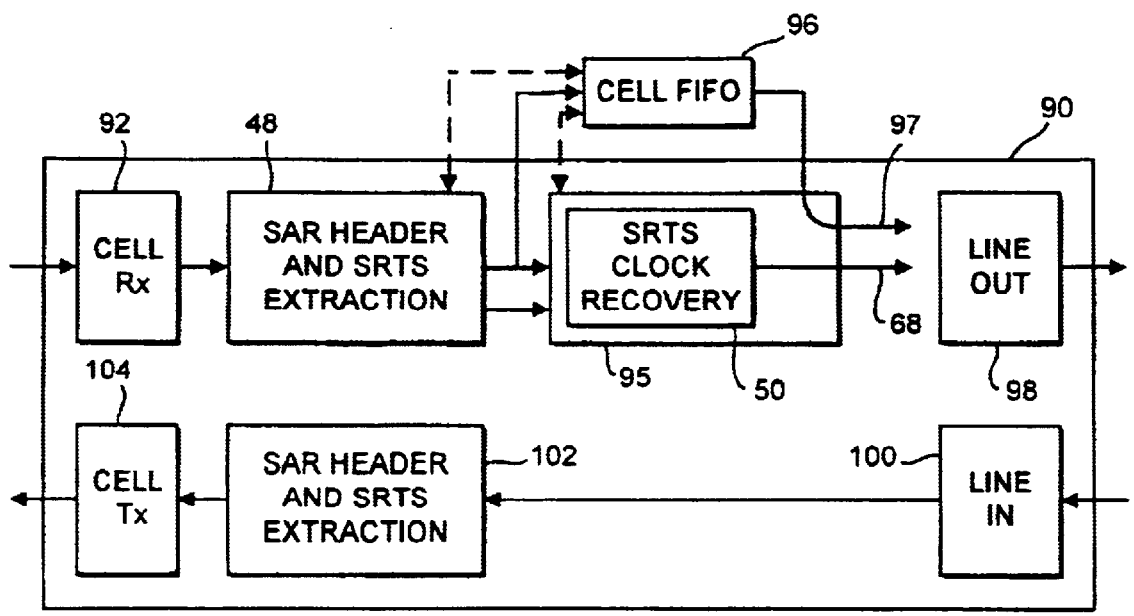
FIG._13
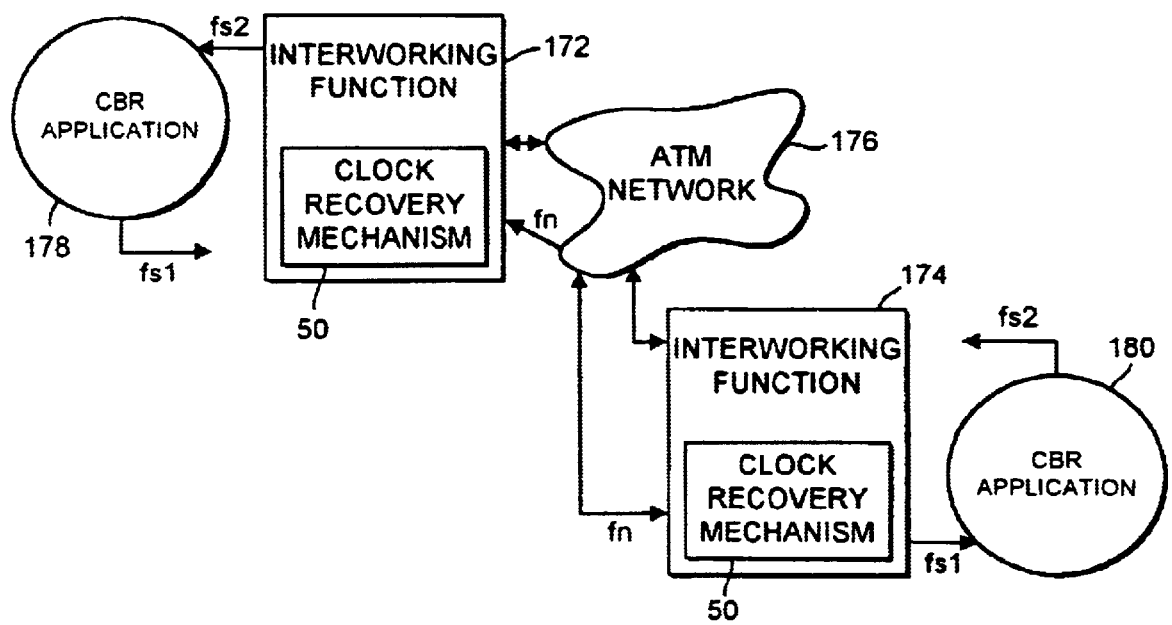
FIG._14

DIGITAL CLOCK RECOVERY

FIELD OF THE INVENTION

The invention relates to a method and apparatus for digital clock recovery, in particular for a packet oriented network environment.

BACKGROUND OF THE INVENTION

An example of a packet oriented transmission technology for the realization of Broadband Integrated Service Networks (BISDN) is the technology called Asynchronous Transfer Mode (ATM). This permits services as diverse as voice, data and video to be transmitted through the same medium and in the same format. The transport of constant bit rate (CBR) data over an ATM network is usually referred to as circuit emulation. The accommodation of constant bit rate (CBR) services by ATM is particularly important, for compatibility with existing systems and future networks, even if ATM is more suitable to the transport of bursty traffic, such as data. One of the critical issues of circuit emulation is the recovery of clock frequency of the source data (the service clock frequency) at the receiver.

ATM's basic transport entity is a 53 byte cell. Five of these bytes are header bytes, and convey information such as link-to-link routing, error correction, service information (priority, payload identifier), and cell type identification. A protocol stack is defined by ITU-T for ATM technology, in which the so-called ATM layer performs operations typically found in layers 2 and 3 of the OSI model. Above the ATM layer is an ATM adaptation layer (AAL), which is divided into segmentation and reassembling layers (SAR) and a convergence sublayer (CS). Five different types of AAL have been defined by ITU-T, covering various applications. The AAL-1 (ATM Adaptation Layer 1) is devoted to CBR services. Of the 48 remaining information bytes of an ATM cell, one used by the AAL1 SAR for functions including timing recovery and cell loss detection which leaves 47 data bytes (376 bits). To transport a CBR service into an ATM network, the data is segmented into cells of 47 bytes, an SAR byte is then added to each cell, the 48 bytes are mapped in an ATM cell and are then sent through the network.

As a result of statistical multiplexing of cells at the source and of queuing delays incurred in ATM switches, successive cells arrive to the destination aperiodically. The deviation from ideal arrival time is called cell jitter or cell delay variation (CDV). It obviously increases with the network load, as queuing delays are functions of the switch load. Cell jitter is composed of a relatively high frequency stuffing jitter and of a low frequency waiting time jitter. The problem with cell jitter is that it can be very large, and except for the fact that its average is zero, its characteristics are mostly unknown.

The ITU-T has set output clock jitter recommendations whereby the frequency shift at 2.048 MHz on emission clocks is +/−50 ppm (1 ppm=1 part per million=2.048 Hz shift).

In order to achieve clock recovery, the exact service frequency should be recovered at the receiver. However, this is not straightforward due to the problems of output jitter and wander control. Jitter is defined as the higher frequency characteristics of a phase variation on a given clock signal. Wander is the lower frequency part of this phase variation. Both are commonly measured in terms of unit intervals (UI), where one UI corresponds to one cycle of the clock signal. ITU-T recommendation G.823 has precisely defined output jitter limits that must be met if the system is to be compatible with any CBR equipment. The bounds on maximum peak-to-peak output jitter for 2.048 Mbits.s$^{-1}$ CBR services are shown in Table 1.

TABLE 1

| Frequency | 20 Hz–18 kHz | 18 kHz–100 kHz |
|---|---|---|
| Jitter | 1.5 UI | 0.2 UI |

Wander tolerance is not as well defined as output jitter. However, input jitter should not be greater than 36.9 UI under 1.2×10−5 Hz.

Two techniques are known for recovering a service, or emission clock at a receiver. A first technique, known as the "adaptive method", recovers the service clock based on the fill-level of a incoming cell buffer. A second technique, known as the "synchronous method" is based on the availability of a common network reference clock between the source and the end equipment.

The common clock used in the synchronous method is distributed by the network, and is available by means of either the so-called Synchronous Digital Hierarchy (SDH) network or its North American version Synchronous Optical NETwork (SONET). As not all CBR equipment is able or willing to be synchronized at the network clock, a method exists to perform CBR transmission at any rate, using this network clock. The method which was first proposed by Bell Laboratories and then adopted by ITU-T is the so-called synchronous residual time stamps (SRTS) technique. This allows transmission at any given bit rate.

The SRTS technique uses the network common clock to generate a unique number (the SRTS, or Synchronous Residual Time Stamp) which, on receipt, is used to recover the service clock. This information is inserted into the SAR byte (the 48th byte) and sent to an ATM cell. Using this common clock completely eliminates the cell jitter problem, as the actual cell arrival instants are not taken into account when recovering the service clock.

FIG. 1 of the accompanying drawings is a schematic block diagram illustrating an example of an SRTS signal generator 10.

The service clock 12 (at frequency fs) is divided by an integer N in a first divider 16. The integer N represents the SRTS period and is typically a multiple of 376, as an ATM cell conveys 47 information bytes, that is 47×8=376 bits. ITU-T recommends that the SRTS 24 is coded on 4 bits. As the SRTS is transported by the SAR byte, and only one bit every two cells can be devoted to SRTS, 8 cells are necessary to convey one time stamp, which leads to a preferred value of N=8×376=3008. The output of the first divider 16 is used as a latching signal to a latch 20 for latching the output of a p-bit free running counter 22, driven by a submultiple fnx of the network clock 14. The output of the latch 20 forms the SRTS 24.

The submultiple fnx of the network clock is generated by dividing the network clock 14 (at the network frequency fn) by a divider x in a second divider 18. The division ratio x is chosen so that the ratio fs/fnx stays over 1 but under 2 in order to reduce jitter and wander on the recovered clock. The value of the network clock depends on the type of network. For SDH network, fn is 155.52 MHz, so fnx will be of the form 155.52/$2^k$. For 2.048 MHz clock recovery, k equals 6, and fnx 2.43 MHz. The SONET network referenced above distributes a 51.84 MHz clock, which leads to a value for fnx of 3.24 MHz.

During a SRTS period (=Nfs clock periods), there are M cycles of the fnx clock. Generally, M is not an integer. The information conveyed by the SRTS 24 is the number of cycle slips between the two clocks at frequency fs and fnx, modulus 2p over a SRTS period (=N periods of the fs clock), rounded towards zero. The residual part, corresponding to the fact that M is not an integer, accumulates until it reaches unity.

FIG. 2 of the accompanying drawings is a schematic block diagram of an SRTS receiver 30 for implementing a known technique to recover the service clock using the SRTS 24. The SRTS receiver 30 comprises an SRTS buffer 32 in which received SRTSs are buffered. An output 24 from the SRTS buffer 32 is supplied to one input of a comparator 34. The other input to the comparator is connected to the output of a free running p-bit counter 36 (locally generated SRTS) which is driven by an fnx clock 38. The output of the comparator and the fnx clock are supplied to a gating circuit 40. The output of the gating circuit is supplied to a phase locked loop (PLL) 42. The output of the PLL 42 forms the clock fs.

In order to illustrate the operation of the SRTS receiver 30 of FIG. 2, it is assumed that the PLL 42 is locked, the gating circuit 40 has just been reset, and a new SRTS 24 has just been extracted from the SRTS buffer 32. The SRTS 24 which has been extracted is supplied to the comparator 34, where it is compared to the output of the free running p-counter 36 driven by the fnx clock 38. A pulse is generated each time the output of the counter 36 matches the received SRTS 24. One of these pulses will give the correct SRTS period. However, it is necessary to determine which of these pulses is the correct one.

A train of pulses from the comparator 34, represented at (a) in FIG. 3, is then fed to the gating circuit 40, which determines which pulse is the correct one. The value of p for the p-bit counter 36 is chosen such that a SRTS 24 represents with no ambiguity a SRTS period. Accordingly, it is known that the correct pulse will occur after a minimum of Mmin pulses of the fnx clock. The gating circuit comprises a counter 48, which receives a gating pulse, represented at (b) in FIG. 3 from a pulse forming circuit 46. The pulse forming circuit 46 is responsive to the output of a counter 44. The counter 44 is arranged to count until Mmin fnx periods have elapsed and then to generate an output synchronised with each correct SRTS. The output of the gate 48, as represented at (c) in FIG. 3, thus gives the real SRTS period. The PLL 42 generates N pulses between two successive pulses output from the gating circuit, the output of the PLL 42 thus represents the service clock fs.

The prior art SRTS technique described above is, however, not an exact technique as it quantifies the difference between the service and network clock. Accordingly, a disadvantage of this technique is that it introduces an error by multiplying the gating circuit output by N, as N+/−e pulses of the service clock between two SRTS pulse intervals.

SUMMARY OF THE INVENTION

Accordingly, there is a need to provide an improved technique for recovering a service clock frequency using an SRTS.

In accordance with one aspect of the present invention, there is provided a clock recovery mechanism for an ATM receiver for recovering a service clock transmitted over an ATM network, the mechanism comprising: an input for receiving an SRTS from the ATM network; a local SRTS generator for locally generating an SRTS; a comparator for comparing a received SRTS and a locally generated SRTS; and a recovered service clock generator responsive to an output of the comparator for generating the recovered service clock and for controlling the local SRTS generator.

An embodiment of the invention enables a locally generated SRTS to be compared directly with the received SRTS. The local SRTS is generated using the same method as used to generate the transmitted SRTS, that is using the network clock fnx and a locally generated clock, at frequency fs. The difference between the locally generated SRTS and the received SRTS can be expressed directly in a number of fnx pulse clocks to be added or removed to the generated fs clock. An embodiment of the present invention can thus provide a digital technique for recovering a service (or source) clock at the receiver location using SRTSs.

Preferably, the local SRTS generator is controllable in response to the recovered service clock. More preferably, the local SRTS generator comprises a divider for dividing the recovered service clock by N. Preferably, the local SRTS generator has a structure which mirrors that of an SRTS generator at an ATM transmitter.

In a preferred embodiment, the local SRTS generator comprises: a latch, an output of which provides the locally generated SRTS; a p-bit free running counter, driven by a submultiple of an ATM network clock, the latch being connected to receive an output from the counter; and a divider having an output connected to a latch input of the latch for latching the output from the counter and an input connected to receive the recovered service clock, the divider outputting the recovered service clock divided by N. This structure corresponds to an STRS generator for an ATM transmitter. In one embodiment, N is 3008 to provide an SRTS period.

Preferably, the recovered service clock generator comprises a controller and a digitally controlled oscillator; the controller comprises an input connected to the comparator, and an output connected to a control input of the digitally controlled oscillator, the controller outputting control signals for controlling the digitally controlled oscillator; and the digitally controlled oscillator has an output for the recovered service clock, the digitally controlled oscillator outputting the recovered service clock under the control of the control signals at the control input.

In a preferred embodiment, the controller comprises a look-up table, the controller being responsive to the comparator outputs for accessing control signals from the look-up table for output to the digitally controlled oscillator.

Preferably, the input for receiving an SRTS from the ATM network comprises an SRTS buffer for buffering received STRSs.

The invention also provides an ATM receiver circuit comprising a mechanism as set out above.

The invention further provides an ATM receiver comprising a mechanism as set out above.

In accordance with another aspect of the invention, there is provided a clock recovery method at an ATM receiver for recovering a service clock transmitted over an ATM network, the method comprising:
  receiving an SRTS from the ATM network;
  generating locally an SRTS;
  comparing a received SRTS and a locally generated SRTS; and
  generating a recovered service clock in response to an output of the comparator and using the recovered service clock to control the local SRTS generation.

In accordance with a further aspect of the invention there is provided a method of circuit emulation over an ATM network comprising, at an ATM transmitter, using a first SRTS generator for generating SRTSs for transmission in response to a CBR service clock and, at an ATM receiver:

receiving SRTSs from the ATM network;

generating locally SRTSs using a second SRTS generator equivalent to the first SRTS generator;

comparing the received SRTSs and the locally generated SRTSs; and generating a recovered CBR service clock in response to an output of the comparator and using the recovered CBR service clock to control the local SRTS generation.

BRIEF DESCRIPTION OF THE DRAWING

An embodiment of the invention will be described hereinafter, by way of example only, with reference to the accompanying drawings in which:

FIG. 1 is a schematic block diagram illustrating an example of an SRTS signal generator;

FIG. 2 is a schematic block diagram of a prior proposal for an SRTS receiver;

FIG. 3 is a timing diagram for explaining the operation of the receiver of FIG. 2;

FIG. 4 is a schematic block diagram of an example of an SRTS receiver in accordance with the present invention;

FIG. 5 is a schematic block representation of an ID counter;

FIG. 6 is a timing diagram for explaining the operation of the ID counter of FIG. 5;

FIG. 7 is a schematic block diagram of a PLL controller of the receiver of FIG. 4;

FIGS. 8–10 are plots for illustrating jitter;

FIGS. 11 and 12 are plots for illustrating error recovery;

FIG. 13 is a schematic diagram of an integrated circuit comprising the clock recovery mechanism of FIG. 4; and FIG. 14 is a schematic diagram of an ATM transmitter and an ATM receiver incorporating the clock recovery mechanism of FIG. 4.

DETAILED DESCRIPTION OF THE INVENTION

FIG. 4 is a schematic block diagram of an example of an SRTS receiver in accordance with the present invention. The receiver in FIG. 4 comprises an SRTS buffer 52 for buffering SRTSs received from the ATM network. The SRTS can be extracted from the received ATM cells by a decoder stage 48.

An output from the SRTS buffer enables a received SRTS to be supplied to one input of a comparator (CMP) 54. The other input of the comparator is connected to receive a locally generated SRTS output from a latch 56. The output of the comparator is connected to a PLL controller 62. The outputs 86B and 86C of the PLL controller 62 are connected to a digital controlled oscillator (DCO) 64, which receives a clock frequency fDCO=Qfs. The output of the DCC 64 forms the recovered service clock fs 68. The output of the DCC 64 is also connected to the input of a divider 66, which divides the frequency fs by N. N for the receiver 50 is chosen to be the same as N for the SRTS generator 10 of FIG. 1. In the present example, N=3008. The output of the divider 66 is used as a latching signal to a latch 56 for latching the output of a p-bit free running counter 58, driven by a submultiple fnx 60 of the network clock. The output of the latch 56 forms the locally generated SRTS.

The operation of the circuit of FIG. 4 will be described in the following.

Assume D is the difference SRTSreceived−SRTSlocal. A difference of +n means that during N periods of the local clock, n pulses of the fnx clock were missing, so that the locally generated fs clock must slow down to compensate for these n pulses. On the other hand, if D is negative, the frequency of the locally generated fs clock must be increased. Accordingly, the PLL-like architecture shown in FIG. 4 is an example of a mechanism to perform this operation.

The example of a PLL-like architecture of FIG. 4 comprises a PLL controller 62, which is described later in more detail with reference to FIG. 7, and works with a DCO 64 based on an ID counter 65, which is illustrated in FIG. 5. An ID counter, driven by a clock at frequency fDCO high enough, followed by a proper divider, will allow addition or removal of reasonable number of pulses providing acceptable jitter performance. The PLL controller 62 acts as a digital filter by providing smoothly to the ID counter, the necessary number of carries and borrows so that the difference between the local and the received SRTS stays at zero (which means that the local output clock fs approaches the service clock). As can be seen in FIG. 4, the locally synthesised fs clock is then used to generate the local SRTS.

The ID counter 65 for implementing the DCO 64 is illustrated in FIG. 5 and has three inputs, namely a clock input (ck), an increment input (inc) and a decrement input (dec). The clock input receives an ID-Clock, namely fDCO (see FIG. 4). Carry pulses 86C are fed to the increment input, while borrow pulses 86B are fed to the decrement input. The ID counter also comprises a toggle flip-flop, which toggles on every positive edge of the ID clock. The ID counter is sensitive to the rising edge of the inc and dec inputs.

The ID counter output (IDout) is supplied to a divider 67 and is given by:

IDout=IDclock.Toggle-FF

In the absence of carry and borrow pulses, the output frequency of the ID counter is one half of the clock frequency. If the Carry gets 'true' when the toggle-FF is 'low', the toggle gets high into the next positive edge of the ID-clock, and stays low during the two ID clocks intervals thereafter. Consequently, the next ID-out pulse is advanced by one ID clock period, and one more pulse is generated during a clock period. When a borrow is fed in the decrement input, the same operations happen symmetrically.

FIG. 6 illustrates the ID counter waveforms. It is assumed that fDCO=Qfs. The output of the ID counter is divided by Q/2 in the divider 67. Where the output signal is to be speeded up, in order to compensate for the difference of the SRTS, a=nQfs/fnx pulses are added to the output of the DCO. Thus to add a pulses on N, the frequency of the added pulse (i.e., of the carry input) has to be afs/N. DCO carries (or borrows) are therefore fed at this frequency. The ID counter imposes the constraint that the frequency of carries or borrows stays below Qfs/3 for each and every carry or (borrow) to be processed. This condition can always be verified in a typical application, where Q is typically 16 and N equals 3008. The "PLL controller" spreads carry or borrow pulses at a frequency of afs/N and thus acts as a 'filter' in analogy with a PLL architecture.

The comparator 54 is implemented as an adder/subtracter which removes the local SRTS from the received SRTS, and drives the "PLL controller" according to the result of the subtraction. This operation is effected modulo 2p. It should be noted that crude subtraction would lead to erroneous results. In a locked mode, the local and received SRTS cannot, in normal conditions (no transmission error, reasonable jitter on emission . . . ), be more than one or two units apart. Problems could arise in the present case when the two SRTS are one unit apart, and one of them is 2p-1. As all operations are made modulus 2p-1, the other one may be 0, and a subtraction will give a value 2p-1 instead of the correct −1. Accordingly, the adder/subtracter 54 comprises logic to ensure that the absolute value of the output of the comparator stays small enough, that is bounded between −2p-1-1 and 2p-1, for example.

As mentioned above, the role of the PLL controller 62 is to spread equally carry and borrow pulses over a SRTS period, according to the output of the comparator. Accordingly, the PLL controller can also be thought of as a filter or spreading logic.

FIG. 7 illustrates one example of an implementation of the PLL controller 62. The comparator 54 output 84 is passed to a look-tip table 72. A counter (Kcounter) 74 counts pulses at fDCO, the frequency for driving the DCO 64. A comparator CMP 80 compares the look-up table and Kcounter values, and when the Kcounter value matches the output of the look-up table, a carry or borrow pulse is generated. The sign of the comparator output 84 causes the multiplexer to apply the pulse to the carry output 86C or to the borrow output 86B.

Table 2 below represents the five first values of k a look-up table 72 of a PLL controller for 2,048 Mbit/s, in particular when fDCO=16 fs, N=3008, fs=2.048 MHz, fnx= 2.43 MHz and where one carry or borrow pulse must be produced every k pulses of the DCO clock to add or remove one fnx pulse from the output.

TABLE 2

| STRS | k | Error on STRS |
|---|---|---|
| 1 | 3569 | 4.63 10-3 |
| 2 | 1782 | 2.25 10-3 |
| 3 | 1189 | 3.36 10-2 |
| 4 | 892 | 4.51 10-3 |
| 5 | 714 | 3.14 10-2 |

The values shown in table 2 are calculated in order to minimize the error on the SRTS. It is, however, possible to play with the values in the look-up table or with the 'spreading logic' in order to reduce jitter and inaccuracy on the recovered SRTS. For example, it is possible to recalculate the values such as one half period is added or removed instead of one, for each mismatch. (i.e. in case of a 1 unit gap between the local and received SRTS, a ½ fnx period is considered to have been added or removed instead of one, and in the case of a 2 unit gap, 3/2 fnx period would be added or removed etc.). This can further improve the quality of the recovered clock.

The periodicity of the SRTS can be used to predict how many pulses must be added/removed to resynchronize the SRTS sequences. Alternatively, another approach could be to change the number of pules to be spread when a mismatch is encountered, not only with respect to the value of the difference between the local and received SRTS but also with respect to the time passed since the previous mismatch; that is the longer the time passed, the nearer the average frequency is to the service frequency, and so it is not necessary to compensate of a full period (or a full half period). If this is to be implemented, logic is provided to take all the necessary parameters into account. The provision of the additional logic required is justified by significant improvements, in particular in terms of jitter amplitude.

To perform jitter analysis, jitter is accumulated during the T first SRTS periods, as long as the received and local SRTS match, and is compensated for during the T+1th SRTS period. The nearer the service frequency is to the DCO centre frequency, the longer it will take for a mis-match between the received and local SRTS to occur, but during the 'matching period' very little jitter will be accumulated.

The accumulated jitter is then compensated for during the T+1th SRTS period, if a difference is detected, and a fixed jitter is introduced over this period. An identical cycle then begins if the total jitter has been reduced to 0 or until the residual jitter, plus the accumulated jitter, involves a difference between the two SRTS. The final, instantaneous, jitter in UI is shown in FIG. 8 for fs=fn+11 ppm. On the abscissa, one unit corresponds to one SRTS period (approximately 1.47 ms). The jitter has been sampled at SRTS frequency (approximately 680 Hz).

The values here therefore represent accumulated jitter over one SRTS period and higher frequency jitter cannot exceed these values. The discontinuities are the consequences of mismatches and corrections. FIG. 9 and FIG. 10 show results of this jitter filtering through band-pass filters, illustrating that it stays within CCITT recommended G.823 limits. FIG. 9 shows jitter amplitude in a 700–100000 Hz band, with one unit on the abscissa corresponding to 0.7 ms. FIG. 10 shows jitter amplitude in a 20–700 Hz band, with one unit on the abscissa corresponding to 0.7 ms.

In various simulations performance of the method and apparatus described above has been evaluated. Precision on the short term (less than 1000 SRTS periods) is in the worst case less than 0.4 ppm on a 2.048 MHz clock, using a DCO driven by a 32.768 MHz clock, with or without jitter. On the long term (10000 SRTS periods or more), a precision of 0.02 ppm is easily obtained without any problem, as shown in FIGS. 9 and 10.

Jitter on the emission clock, and imprecision on the DCO clock can cause effects, which will never be greater than a 1 ppm slip, generating a 1 UI wander at very low frequency (2 Hz), which stays in the bounds defined by CCITT.

FIG. 11 shows error (in ppm) on the recovered clock. On the abscissa are the number of SRTS taken into account for clock recovery for a simulation of a 2.048–10 ppm emission clock. Note the periodicity of the error.

FIG. 11 illustrates the type of error (error=f(t)//fs=f0–10 ppm) the SRTS method induces. The error accumulates over i SRTS periods, and is compensated for during the i+1th period, when the SRTS number varies of one unit. When the longer term average is taken, however, the error weight can be considered negligible, and the real frequency is reached. But it will still take a non-negligible amount of time for really good precision (less than 0.01 ppm off-set) to be reached.

FIG. 12 is substantially the same as FIG. 9, except that it is for a −50 ppm difference (error=f(t)//fs=f0–50 ppm).

In FIG. 12, the differences between recovered and received SRTS become so frequent that periodicity is destroyed, due to error accumulation. 250 SRTS periods (0.36 s) are sufficient to make sure that the error stays below 1 ppm.

FIG. 13 is a schematic block representation of an integrated circuit 90 comprising the adaptive clock recovery mechanism 50 of FIG. 4. In FIG. 13, certain functional blocks are represented which are related to the clock recovery mechanism 50. The integrated circuit can comprise further functional elements according to the specific application of the integrated circuit. In FIG. 13, a cell receiver circuit 92 receives cells from an ATM network. The output of the cell receiver circuit is passed to an SAR header and SRTS extractor 48, which extracts the header and SRTS information. The cell data is buffered in a cell FIFO 96. The SRTS information is passed to the SRTS FIFO buffer 52 of the clock recovery mechanism 50 of FIG. 4. Further control circuitry 95, not shown, can be associated with the adaptive clock mechanism 50. The recovered service clock 68 output from the adaptive clock recovery mechanism is associated with the cell data buffered in the cell FIFO 96 and can be passed to circuitry downstream thereof. The downstream circuitry can be formed of or comprise line out circuit 98 for local data output as well as other circuitry (not shown). Control signal lines are represented by dashed lines in FIG. 13. FIG. 13 also shows a line input 100 for local data input, an SAR header and SRTS generator 102 and a cell transmission circuit 104 (which can be of conventional design) for transmitting cells to the ATM network.

The integrated circuit, or discrete circuits, could be implemented on, for example, a multimedia interface card for providing voice, etc.

FIG. 14 is schematic overview of an ATM circuit emulation system in which an embodiment of the present invention may be incorporated. As shown in FIG. 14, first and second interworking function units 172 and 174 communicate with each other via an ATM network 176 using the same network frequency fn (e.g., SDH or SONET). Each of the interworking function units 172 includes a clock recovery mechanism 50 as described earlier. The clock recovery mechanism 50 can be implemented as any suitable device (e.g., an integrated circuit with clock recovery logic for implementing the functions described above on a computer adapter card). The first interworking function unit 172 provides an interface between a first CBR application 178 having a first service frequency fs1 and the ATM network. The second interworking function unit 174 provides an interface between a second CBR application 180 having a second service frequency fs2 and the ATM network. The clock recovery mechanism 50 in the second interworking function unit 174 enables the first service clock fs1 to be recovered at the second interworking function unit 174. The clock recovery mechanism 50 in the first interworking function unit 172 enables the second service clock fs2 to be recovered at the first interworking function unit 174. In this way circuit emulation can be performed via the ATM network. The interworking function units supporting the CBR applications can be any appropriate information processing devices as required for a particular installation, including, by way of example only, computers such as workstations, computer servers, mainframe computers, or video equipment, voice equipment, I/O interface cards for such devices, and so on.

Thus, there has been described a digital clock recovery technique for circuit emulation over an ATM network with output jitter reduction.

By taking the difference between the received SRTS and the locally generated SRTS, the clock recovery technique described herein can smoothly compensate the accumulated jitter with the spreading logic and, therefore, exhibit a very low jitter on the regenerated system frequency.

This clock recovery technique is also very reliable if the DCO clock exhibits a frequency drift, provided this drift is not too large and a sufficient number of bits is chosen to convey the SRTS number. This condition is only met if the difference between the nominal and the actual DCO frequency stays between the bounds defined by the SRTS. If 4 bits are used for the SRTS, a tolerance of +/−1960 ppm (roughly 4 kHz for fDCO=32.768 MHz) is acceptable. The recovered clock quality in terms of frequency will decrease as the centre frequency precision worsens, but a 4 kHz margin is very comfortable, and simulations proved that even with a poor quality system clock, clock recovery can still be achieved.

Although a particular embodiment of the invention has been described, it will be appreciated that many additions, alternatives and modifications thereto can be envisaged within the scope of the present invention.

What is claimed is:

1. A clock recovery mechanism for an ATM receiver for recovering a service clock transmitted over an ATM network, said mechanism comprising:

an input for receiving an SRTS from said ATM network;

a local SRTS generator for locally generating an SRTS;

a comparator for comparing said received SRTS and said locally generated SRTS;

a controller configured to generate two or more control signals in response to (i) an output of said comparator and (ii) a clock signal; and a clock generator configured to generate said recovered service clock in response to said two or more control signals and said clock signal, wherein said clock generator is configured to generate a plurality of pulses in response to said two or more control signals and said clock signal, where a first one of said two or more control signals is configured to advance said plurality of pulses and another of said two or more control signals is configured to deli said plurality of pulses.

2. A mechanism according to claim 1, wherein said local SRTS generator is controllable in response to said recovered service clock.

3. A mechanism according to claim 2, wherein said local SRTS generator comprises a divider for dividing said recovered service clock by N.

4. A mechanism according to claim 3, wherein said local SRTS generator has a structure which mirrors that of an SRTS generator at an ATM transmitter.

5. A mechanism according to claim 1, wherein said local SRTS generator comprises:

a latch, an output of which provides said locally generated SRTS;

a p-bit free running counter, driven by a submultiple of an ATM network clock, said latch being connected to receive an output from said counter; and a divider having an output connected to a latch input of said latch for latching said output from said counter and an input connected to receive said recovered service clock, said divider outputting said recovered service clock divided by N.

6. A mechanism according to claim 5, wherein N is 3008.

7. A mechanism according to claim 5, wherein said submultiple of said ATM network clock is designed to reduce jitter and wander on said recovered service clock.

8. A mechanism according to claim 1, wherein:

said clock generator comprises a digitally controlled oscillator;

said controller comprises (i) an input connected to receive said output of said comparator and (ii) an output connected to a control input of said digitally controlled oscillator, said controller outputting said two or more control signals for controlling said digitally controlled oscillator; and said digitally controlled oscillator has an output for presenting said recovered service clock, said digitally controlled oscillator adding and removing pulses of said recovered service clock under the control of said control signals at said control input.

9. A mechanism according to claim 1, wherein said controller comprises a look-up table, said controller being responsive to said comparator outputs for accessing values from said look-up table for generating said two or more control signals.

10. A mechanism according to claim 1, wherein said input for receiving an SRTS from said ATM network comprises an SRTS buffer.

11. An ATM receiver comprising a mechanism according to claim 1.

12. A clock recovery mechanism according to claim 1, wherein:

said controller comprises (i) a look-up table configured to access one or more values in response to said output of said comparator, (ii) a counter configured to generate a count value in response to said clock signal and (iii) a multiplexer configured to generate said two or more control signals in response to said count value, said look-up table values, and said output of said comparator; and said clock generator comprises (i) an ID counter configured to generate a plurality of pulses in response to said clock signal and said two or more control signals and (ii) a divider configured to generate said recovered service clock in response to said plurality of pulses.

13. A clock recovery method in an ATM receiver for recovering a service clock transmitted over an ATM network, said method comprising the steps of:

receiving an SRTS from said ATM network;

generating a locally generated SRTS;

comparing a received SRTS and a locally generated SRTS;

generating two or more control signals in response to a result of said comparison and a clock signal;

generating a plurality of pulses in response to said two or more control signals and said clock signal, wherein a first one of said two or more control signals is configured to advance said plurality of pulses and another of said two or more control signals is configured to delay said plurality of pulses; and a recovered service clock in response to said plurality of pulse.

14. A method according to claim 13, further comprising the step of dividing said recovered service clock by N for controlling said local SRTS generation.

15. A method according to claim 14, further comprising generating said local SRTS in the same manner as the generation of an SRTS at an ATM transmitter.

16. A method according to claim 14, where N is 3008.

17. A method according to claim 14, further comprising a step of:

increasing and decreasing said frequency of said recovered service clock to minimize a difference between said received SRTS and said locally generated SRTS.

18. A method according to claim 17, wherein said two or more control signals are generated in response to a value from a look-up table presented in response to a result of said comparison of said received SRTS and said locally generated SRTS.

19. A method according to claim 13, wherein said local SRTS generation comprises:

latching an output of a p-bit free running counter, driven by a submultiple of an ATM network clock, at timings determined by an output of a divide-by-N divider connected to receive said recovered service clock.

20. A method according to claim 19, wherein said submultiple of said ATM network clock is designed to reduce jitter and wander on the recovered service clock.

21. A method of circuit emulation over an ATM network comprising, at an ATM transmitter, using a first SRTS generator for generating SRTSs for transmission in response to a CBR service clock and, at an ATM receiver:

receiving SRTSs from said ATM network;

generating locally generated SRTSs using a second SRTS generator equivalent to said first SRTS generator;

comparing said received SRTSs and said locally generated SRTSs;

generating two or more control signals in response to a result of said comparison and a clock signal;

generating a plurality of pulses in response to said two or more control signals and said clock signal, wherein a first one of said two or more control signals is configured to advance said plurality of pulses and another of said two or more control signals is configured to delay said plurality of pulses;

generating a recovered CBR service clock in response to said plurality of pulses; and using said recovered CBR service clock to generate said local SRTS.

22. A method according to claim 21, wherein said local SRTS generating step comprises:

latching an output of a p-bit free running counter, driven by a submultiple of an ATM network clock, at timings determined by an output of a divide-by-N divider connected to receive a recovered CBR service clock.

23. A method according to claim 22, wherein said submultiple of said ATM network clock is designed to reduce jitter and wander on the recovered service clock.

* * * * *